United States Patent

Lynch

[15] 3,653,862

[45] Apr. 4, 1972

[54] GLASS CERAMIC BODIES, AND METHOD BY BORIC OXIDE TREATMENT

[72] Inventor: Charles S. Lynch, Toledo, Ohio
[73] Assignee: Owens-Illinois, Inc.
[22] Filed: Jan. 13, 1970
[21] Appl. No.: 1,990

Related U.S. Application Data

[63] Continuation of Ser. No. 583,410, Sept. 30, 1966, abandoned.

[52] U.S. Cl............................................65/30, 65/33, 65/60, 65/3, 117/124 B
[51] Int. Cl......................................C03b 29/00, C03c 15/00
[58] Field of Search........................65/30, 33, 60, 3; 117/124

[56] References Cited

UNITED STATES PATENTS 3,384,508 5/1968 Bopp et al..............................65/33 X
3,493,355 2/1970 Wu.............................................65/30

*Primary Examiner*—Frank W. Miga
*Attorney*—W. A. Schaich and Charles S. Lynch

[57] ABSTRACT

A method of making a strong, high expansion ceramic body resulting from thermal crystallization of an alumino-silicate glass body wherein the body is contacted with boric oxide vapors at a temperature above 1400° F. for at least 10 minutes until the boric oxide vapors have reacted with the surface layer of the body to form an integral surface layer of borosilicate glass on the body. Upon cooling, a compressive stress forms in the vitreous layer. The lineal coefficient of thermal expansion of the ceramic body is at least $50 \times 10^{-7}/°C$ over the range 0° to 300° C.

4 Claims, No Drawings

GLASS CERAMIC BODIES, AND METHOD BY BORIC OXIDE TREATMENT

This application is a continuation of applicant's copending application Ser. No. 583,410, filed Sept. 30, 1966 now abandoned.

The present invention relates to glass-ceramic materials and formed bodies thereof. More particularly, the present invention relates to improved glass-ceramics, and to techniques and methods for making same.

Glass-ceramics are frequently referred to in the art as semi-crystalline ceramic materials. These materials are made by in situ thermal crystallization of a glass body to produce a multitude of fine crystals dispersed throughout the body in the glassy matrix remaining after such in situ crystallization.

Methods of making glass-ceramic materials are well known in the art and are described herein only in the interest of completeness in disclosure. Generally speaking, a crystallizable glass composition is melted and thereafter formed into the desired shape by conventional means such as press molding, casting, blow molding, tube drawing or the like. These solid glass, formed articles are then cooled down to about the glass annealing point or lower, and are heated in an initial low temperature heat treatment range to form many nuclei or crystallites, and are thereafter heated, usually in a higher temperature range, to complete the crystallization to the desired degree. The optimum heat treatment schedule depends, as will be understood, on the particular glass composition and its tendency to form nuclei, and the rate of formation of nuclei and the rate of crystallization or crystal growth. Therefore, it is not possible to specify a heat treatment schedule that will be common to all crystallizable glass compositions. In fact, it is possible to carry out the entire nucleation and crystallization heat treatment isothermally by employing a relatively long heat treatment time at a relatively low temperature suitable for nuclei formation, such as in the range from 100° F. below to 200° F. above the annealing point temperature of the glass.

In actual practice, it has been found that the entire crystallization process, including nucleation, can be accomplished on one lehr belt continuously advancing the article through successive temperature zones to effect nucleation and crystallization.

While prior art glass-ceramic bodies have many desirable properties and are often suitable for use in certain types of tableware such as plates, cups and tea pots, as well as for various types of laboratory and specialty applications, it would be desirable for many applications to increase the basic of the strength of the semi-crystalline material.

Not all of the variables controlling the strength of glass-ceramics are understood, but there are two basic factors that must be considered in any strengthening process. It is well known that glass-ceramic materials generally fail in tension, and secondly that these stress failures originate at the surface of the body. Governed by these considerations, methods have been developed in the art to increase the strength of these glass-ceramic materials by inducing a surface compressive stress. These compressive stresses have heretofore been developed, for instance, by overlaying a ceramic coating such as a slip of an enamel or glaze formulation, followed by a heat treatment to eliminate the slip vehicle and cause the glaze to fuse and mature, thus coating the glass-ceramic substrate. The glaze or enamel formulation chosen has a coefficient of expansion lower than the substrate, and thus on cooling compressive stress is developed in the surface layer. This process requires careful formulation, preparation, and application of the glaze or enamel material to assure the proper ratio of coefficients of expansion between the glaze and the glass-ceramic body to be strengthened. It is well known in the art that an improper coefficient of expansion ratio will cause an unattractive appearance due to crazing or stress cracking, with the concomitant result that there is no significant improvement in strength of the finished composite.

A substantial contribution to the art would therefore be realized if a method were developed to increase the strength of glass-ceramics while at the same time avoiding the shortcomings enumerated above.

It is therefore an object of the present invention to provide a method of increasing the strength of glass-ceramic materials which is readily incorporated into conventional glass-ceramic manufacturing operations.

It is a further object of the present invention to provide a novel method of producing a glass-ceramic whereby the final body bears a surface compressive layer of vitreous character, said vitreous compressive layer being integrally joined to the semi-crystalline ceramic substrate.

Another object is to provide a method whereby a surface compressive layer can be developed on a glass-ceramic body by an economical process.

Another object is to provide a method of strengthening semi-crystalline ceramic articles by the in situ formation of a substantially vitreous borosilicate surface layer.

A further object of this invention is to provide a method for strengthening semi-crystalline alkali alumino-silicate materials through the formation of a vitreous, compressive surface layer.

Another object is to provide a novel glass-ceramic body having an integral vitreous surface layer under compressive stress.

Other objects, as well as aspects and advantages, of the present invention will become apparent from the following detailed description.

In attaining the objects of this invention, one feature resides in exposing an aluminosilicate glass-ceramic body or a vitreous aluminosilicate thermally crystallizable body, to vaporous boric oxide, whereby the boric oxide under the conditions of treatment forms a substantially vitreous borosilicate compressive layer by reaction with a surface layer of said body.

It is especially efficacious to practice the present invention by exposing the formed glass body prior to crystallization to an atmosphere rich in $B_2O_3$. The glass body is heated in the presence of the $B_2O_3$ or $B_2O_3$ pyrolyzable compound to a temperature sufficient to produce vaporous $B_2O_3$ which contacts the surface of the body and reacts therewith to form a vitreous borosilicate layer thereon and integral therewith. The glass body is maintained at a temperature for a time sufficient to produce a semi-crystalline ceramic body by in situ thermal crystallization while in contact with the $B_2O_3$, as hereinafter described. The semi-crystalline body formed by the aforesaid treatment has an essentially vitreous borosilicate surface layer, resulting from reaction of the $B_2O_3$ with the surface layer of the silicate body.

In the foregoing embodiment of the invention a particular advantage is that no extra heat treatment step is required, since heat treatment is necessary for the crystallization of the glass to form the glass-ceramic, regardless of whether the $B_2O_3$ vapors be present or not. On the other hand, the glass-ceramic can be previously made by in situ thermal crystallization of the solid glass object or body, and thereafter contacted while at a temperature of at least 1,400° F. for at least 10 minutes with boric oxide vapors, thus reacting $B_2O_3$ with surface portions of the glass-ceramic to form the vitreous layer of borosilicate glass integral with the surface of the glass-ceramic. While an extra heat treatment step may be necessary, one may wish to effect the boric oxide treatment in a separate kiln or furnace, thus avoiding contamination of the main kiln with boric oxide.

It has been discovered that this process is particularly effective in strengthening an aluminosilicate glass-ceramic material that has a comparatively high coefficient of expansion. By this is meant an average lineal coefficient of thermal expansion at least $50 \times 10^{-7}/°C$. over the range zero to 300° C., and preferably at least $70 \times 10^{-7}/°C$ over the same range.

While it is to be understood that this invention can be practiced in conjunction with any silicate glass-ceramic possessing thermal expansion characteristics as described above, I have discovered that this method can be utilized especially effectively with respect to he system $R_2O-Al_2O_3-SiO_2$ wherein $R_2O$ represents the alkali oxides of $Na_2O$ or $Na_2O$ plus $K_2O$. These components plus a nucleant usually make up at least 85% by weight of the total starting material glass or the final glass-ceramic composition. In addition, the composition can also contain compatible metal oxide or halide modifying agents, for instance, MgO, CdO, ZnO, CoO, CaO, BaO, NaF, CaF$_2$, LiF, MnO, FeO, NiO, B$_2$O$_3$, KF, PbO and P$_2$O$_5$. It is usually necessary that there be at least one nucleating agent present. Nucleating agents such as Cr$_2$O$_3$, ZrO$_2$, TiO$_2$ and SnO$_2$ are commonly used in total amounts ranging from about 0.1 percent to about 12 percent by weight.

A now preferred class of such compositions of the base glass and the glass-ceramic formed therefrom by thermal in situ crystallization contain as the sole essential constituents the following components in the following weight percentage ranges in the total composition:

| Component | Percent by Weight |
|---|---|
| SiO$_2$ | 44–52 |
| Al$_2$O$_3$ | 22–29 |
| SiO$_2$+Al$_2$O$_3$ | 69–76 |
| Na$_2$O | 15–22 |
| K$_2$O | 0–3 |
| R$_2$O (Na$_2$O+K$_2$O) | 17–22 |
| (Cr$_2$O$_3$andzZrO$_2$+TiO$_2$+SnO$_2$) | 0.1–12 | where the listed components comprise at least 85 percent by weight of the glass or the glass-ceramic. The foregoing compositions in the glass-ceramic or crystallized state have average lineal thermal expansion coefficients of well over 50 × 10$^{-7}$/°C. over the range zero to 300°C. I have found that such glass-ceramics, which contain nepheline as the major crystalline species, can be effectively utilized in the present process to form products of this invention.

Preferably, the glass-ceramics and glass precursors discussed in the last paragraph (1) contain SiO$_2$ in such an amount that its weight ratio relative to the combined weight of (Na$_2$O+b-2O) is in the range from 2.1 to 3, and (2) contain alumina in such an amount that the combined mole ratio of (Na$_2$O+KO) to moles of Al$_2$O$_3$ is at least 1.02, and (3) contain 6–12 weight percent TiO$_2$ as the nucleation agent selected.

Accordingly a glass of the foregoing description is melted and is thereafter formed by conventional means such as press molding, casting, blow molding, tube drawing, or the like.

The formed glass object, which has been cooled down to about its annealing point or lower, is first heated in an initial low temperature heat treatment range to form many nuclei or crystallites, and is thereafter heated usually in a higher temperature range, to complete the crystallization to the desired degree. The optimum heat treatment schedule depends, as will be understood, on the particular glass composition and its tendency to form nuclei, and the rate of formation of nuclei and the rate of crystallization. As previously indicated, it is thus not possible to specify a heat treatment schedule that will be common to all the foregoing glasses.

However, it is usually preferred that the first-mentioned low temperature heat treatment be in a range of temperatures which promotes a high rate of formation of nuclei or crystallites, wherein "nuclei" are defined as sub-microscopic precursors of crystalline species or as a finely dispersed submicroscopic immiscible glassy phase. The mechanism of crystal initiation for the present glasses is not definitely known, nor is it known whether the first phase that separates during the crystallization heat treatment schedule is an immiscible glassy phase or is a separate crystallite or crystalline phase. Also, it is difficult to measure directly the range of temperatures in which the higher rates of nuclei formation occur, or in other words, where the optimum temperature range for the initial heat treatment is to be located. However, this temperature range usually is from the annealing point of the glass to 250° F. above the annealing point. The annealing point, as defined herein, can be determined by ASTM designations C 336–54T, with the testing apparatus being calibrated using fibers of standard glasses having known annealing and strain points as specified and published by the National Bureau of Standards.

While the best temperature range for maximum nuclei formation is difficult to measure directly, the optimum initial low temperature heat treatment range can be empirically determined employing small droplets of the glass and a micro-furnace capable of very rapid temperature change and accurate temperature control. A droplet of the glass, cooled to below the annealing point temperature, can be rapidly heated in the micro-furnace to a specific temperature between the annealing point and 250° F. above the annealing point, and held at such temperature for a specified time interval, the length of time of heating depending, again, upon the particular glass. Thus, if the glass inherently very rapidly forms nuclei, a shorter standard time at the low temperature can be used than if the nuclei are relatively only slowly formed. In any event, as an example, a droplet of the glass can be heated for, say, 15 minutes at 60° F. above the annealing point temperature. Thereafter the droplet of glass in the micro-furnace can be very rapidly heated to a predetermined crystallization temperature, for instance, within the range 1,750°–1,900° F., and held at such predetermined temperature for a specific length of time, for instance, one-half hour. This process can be repeated, using the same length of time of initial and final heating and the same temperature of final heating, but using different initial heating temperatures, say 40° 80°100°, and 120° F. above the annealing point temperature. Thereafter by microscopic examination, one can determine which initial heat treatments resulted in formation of the most and smallest crystals, and thus determine the approximate temperature range where a maximum number of crystallization centers are formed. Thereafter, an optimum heat treatment schedule can be worked out by varying the length of time in the initial heat treatment range that appears to be optimum and by varying time and temperatures of heating in the final crystallization heat treatment range. Properties such as the fineness of the crystals and the strength of samples treated according to various temperature schedules can be determined as an aid in picking an optimum heat treatment schedule for the properties desired.

The process of thermal in situ crystallization thus usually comprises heat treating the formed article in an optimum initial temperature range between the annealing point and 250° F. above the annealing point for a time of at least one-half hour, usually at least 1 hour, and thereafter heat treating in a higher crystallization temperature range. The time of initial heat treatment in the range from the annealing point to 250° F. above the annealing point has no upper limit; usually it is not more than 5 or 6 hours, but longer times are not in the least harmful and merely increase the cost of processing. The crystallization heat treatment stage is effected at higher temperatures in the range from about 1,700°–1,950° F., with a sufficient length of time of heating in the high temperature range to effect in situ crystallization to at least the extent that the resulting glass-ceramic product after cooling to room temperature and reheating, will not substantially deform under its own weight when held for one hour at a temperature 400° F. above the annealing point of the original glass. Thus, a rod, 7 inches long and about one-fourth inch in diameter supported near each end by knife edges spaced 6 inches apart will not deform or sag at the center as much as one-eighth inch. Obviously, a degree of crystallization that passes this test represents a rather highly crystalline material, since glass or glass with only 5–10% crystalline material would obviously deform badly when held at a temperature so far above its annealing point. However, it is not possible to determine the exact relative amounts of crystalline and vitreous material in such densely crystallized materials as are produced by the present invention. Generally, times of heating in the temperature range of 1,700° to 1,950° are from 15 minutes to 6 hours, usually from 1/2 to 4 hours.

In any event, the overall heat treatment chosen, that is, the initial or nucleation heat treatment and the crystallization heat treatment, effected at the higher temperature, results in an at least partially crystalline ceramic body whose entire interior contains a multitude of randomly oriented, substantially homogeneously dispersed crystals, essentially all of which crystals are in their largest lineal dimension less than 30 microns across. The products are densely crystallized, hard, and non-porous.

As will be understood, when going from the initial or nucleation heat treatment temperature to the higher crystallization temperature, it is usually preferred to proceed slowly enough or to stop at intermediate plateaus long enough, to effect appreciable crystallization in the intermediate temperature range, at least to such a degree that a rigid crystalline network is formed that prevents the article from slumping. Of course, in heat treating articles such as flat plates that can be case in a mold and heat treated in the mold, the slumping problem is not important and not as much care need be exercised.

Although the specific examples show several plateaus of heat treatment temperatures, the entire heat treatment can be effected using slowly and continuously rising temperatures, and it is often desirable to employ different heating rates at various parts of the process. For instance, in the nucleation heat treatment temperature range the heating rate is usually slower than when going from this lower temperature range to the final crystallization temperature range.

As determined by X-ray powder diffraction measurements, the products of the crystallization step contain nepheline or a nepheline-like crystalline phase as the major crystalline phase. In other words, the nepheline or nepheline-like crystalline phase is present in the ceramic product in much larger volume than any other crystalline phase, as determined by X-ray powder diffraction data.

The selected boron compound used for treating such glass-ceramics during or after formation by crystallization must be boric oxide or be pyrolyzable (decomposable under the influence of heat) to boric oxide. In most instances, the choice of the compound utilized will be based on the process economics.

The thickness of the vitreous, borosilicate compressive layer produced by the method of this invention depends in part on the length of time of exposure to the boric oxide enriched atmosphere at the elevated temperatures. The time of exposure is then determined in advance based on the expected service conditions of semi-crystalline articles under treatment. If the semi-crystalline body is to be subjected to conditions of severe abrasion and abuse, it is understood that a longer boron compound exposure is desirable in order to obtain a relatively thicker vitreous borosilicate layer.

The length of time of exposure to the boron enriched atmosphere will generally range from 10 minutes to about 5 hours. The maximum temperature of the glass-ceramic body surface during such exposure is preferably at least 1,400° F. for the times indicated. Longer exposure times are not necessary but can be used. When the $B_2O_3$ exposure is effected during crystallization heat treatment, the time of contact of the crystallizing body with $B_2O_3$ vapors may be over 5 hours because the crystallization heating cycle may be over such length of time.

I have found that the normal crystallization heat treatment cycle carried out in the presence of boric oxide vapor produces significant improvements in the strength. Present information from analysis of hydrofluoric acid etched layers shows that the surface borosilicate layer formed during the crystallization process is usually more than 5 and less than 100 microns in thickness. At any rate, I have found that effective thicknesses can be accomplished without drastically departing from the normal crystallization heat cycle required for the alkali aluminosilicate systems.

At any rate tests show that the vitreous layer is integral with the glass-ceramic substrate. At the elevated temperatures specified, the boron oxide, whether it be derived from inorganic or organic material, reacts with a surface layer of the silicate substrate, forming a surface glassy layer, a mutual solution comprising boric oxide, aluminum oxide, alkali metal oxide and silica. It is emphasized that the reason it is possible to achieve this in situ formation of a vitreous compressive layer, and yet to avoid the development of surface cracks and fractures, is that the coefficient of expansion of the vitreous layer is in proper relationship to (i.e., lower than) the expansion coefficient of the substrate. The compressive stress develops in the vitreous borosilicate layer on cooling the composite structure.

The glasses can be melted in the normal manner in gas-fired furnaces, preferably using slightly oxidizing conditions, or in electric furnaces from normal, common batch materials. Electric boosting can be provided in gas fired furnaces where desired. In the laboratory platinum crucibles can be used. In larger furnaces high quality refractories are employed, such as high alumina refractories. When employing alumina refractories, it must be remembered that some alumina may enter the composition from the refractories, the amount depending in part upon the volume of charge in relation to the surface area of the furnace, temperature, length of time of melting, etc. Some adjustment in the batch composition may be necessary to account for the alumina from the refractory.

In a typical example of the method of the invention, flint sand, high purity alumina, high purity rutile and C.P. grade sodium carbonate were melted to a glass in a platinum crucible in a gas-fired furnace using slightly oxidizing conditions. Melting time was 22 hours at 2,800° F., with mechanical stirring. Table I shows the composition and properties of the glass formed, and some properties of the glass-ceramic formed by the heat treatment set forth in Example I.

TABLE I

| Oxide Composition and Properties of a Typical Crystallizable Glass | |
|---|---|
| Component | Percent Analysis by Weight |
| $SiO_2$ | 48.1 |
| $Al_2O_3$ | 26.4 |
| $Na_2O$ | 17.5 |
| $TiO_2$ | 8 |
| Glass Liquidus Temp. | 2,215° F. |
| Glass Log 4 Viscosity Temp. | 2,210° F. |
| Coefficient of Thermal Expansion (0–300° C) | |
| Glass | $79 \times 10^{-7}/°C$ (0°–300°C) |
| Bulk crystallized when heat treated as in Example I | $90 - 100 \times 10^{-7}/°C$ (0°–300°C) |

The predominant crystalline phase in the glass-ceramic was nepheline, when heat treated as in Example I.

EXAMPLE I

Glass rods were pulled from the composition of Table I by conventional forming techniques. Several samples of these rods were then subjected to a crystallization cycle in a conventional electric laboratory furnace, as follows:

| Time (hours) | Temperature (°F) |
|---|---|
| 2 | 1,400 |
| 1 | 1,450 |
| 1 | 1,500 |
| 1 | 1,800 |

At the end of this treatment the rods were gradually cooled to room temperature. The samples were observed to have crystallized. This example was designed to serve as a control so the benefit of the process of invention can be readily determined.

The modulus of rupture of the bulk crystallized samples was then determined by conventional techniques utilizing three point loading on Tinius-Olsen equipment. In addition, the modulus of rupture was determined for samples of the crystallized glass that had been subjected to a laboratory abrasion technique. This abrasion technique was developed to simulate very severe service conditions and comprises mounting the rod in a drill chuck and rotating the sample slowly for a few seconds while 320 grit abrasive paper is held in contact with the center of the sample.

The modulus of rupture data is reported in Table II.

EXAMPLE II

Several samples crystallized in Example I, were heated to 1,800° F. in a standard laboratory electric furnace. When the temperature was stabilized at 1,800° F., a small amount of comminuted C.P. grade boric anhydride ($B_2O_3$) was introduced into the closed furnace in an open crucible and allowed to vaporize. After 1 hour at 1,800° F., the samples were allowed to cool slowly to room temperature. The samples were observed to be coated with a glossy, integral and strongly adherent, vitreous borosilicate glaze layer which was under compressive stress. The modulus of rupture was determined according to the method of Example I in both the abraded and unabraded conditions as previously described. The data is reported in Table II.

EXAMPLE III

Example I was duplicated in every detail except that a small amount of comminuted C.P. grade boric anhydride was placed in the closed electric furnace in an open crucible before the heat treatment was begun, and $B_2O_3$ vapors were maintained therein during the heat treatment. In this embodiment, conversion of the glass to the glass-ceramic was accomplished in the presence of vapors of $B_2O_3$. At the end of this treatment, the samples were similar in appearance to those reported in Example II and contained an integral, vitreous borosilicate layer more than 5 microns thick and under compressive stress. The modulus of rupture for the abraded and unabraded samples are set forth in the following Table II.

TABLE II

Modulus of Rupture Data for Experiments Described in the Prededing Examples

| Example No. | Modulus of Rupture (p.s.i.) unabraded | abraded |
| --- | --- | --- |
| I (control) | 20,200 | 15,300 |
| II (Boron compound treatment after crystallization) | 26,400 | 16,900 |
| III (Boron compound treatment during crystallization) | 29,100 | 24,600 |

From the foregoing examples it is apparent to one skilled in the art that an important feature of the invention resides in the reaction of $B_2O_3$ from a vapor with the surface of the silicate glass or glass-ceramic material at elevated temperature. The initial boron compound utilized may be either organic or inorganic in nature so long as it yields boric oxide vapors by decomposition at the elevated temperatures of treatment. The boron treatment of the surface with a member selected from $B_2O_3$ and a boron compound yielding $B_2O_3$ under the conditions of treatment is at temperatures high enough (1,400° F. or higher) to form the borosilicate glassy layer.

Usually the boron compound starting material used is inorganic. Suitable inorganic boron compounds include boric oxide, boric acid, hydrated and dehydrated alkaline earth metal borates, hydrated and dehydrated alkali metal borates and ammonium borate.

While the temperature required to form the vitreous layer is at least 1,400° F., it is known that the vitreous layer will form more rapidly at the higher temperatures in the range of 1,800° – 2,000° F. Practical considerations discourage forming the vitreous layer at such high temperatures that the semi-crystalline body substrate material begins to deform.

The strengthened glass-ceramic products of the present invention are useful in many applications where conventional ceramics are used; for instance, especially useful products are tableware-plates, cups, saucers and the like, where superior strength is a distinct asset.

While preferred embodiments have been described above in detail, it will be understood that various modifications can be followed without departing from the spirit and scope of the disclosure or from the scope of the following claims.

I claim:

1. The method of making a strong, high expansion ceramic body resulting from thermal crystallization of an aluminosilicate glass body comprising $SiO_2$, $Al_2O_3$ and a nucleant selected from $TiO_2$, $ZrO_2$, $SnO_2$ and $Cr_2O_3$ present in the glass composition in an amount from 0.1 to 12 weight percent, which comprises contacting said body with boric oxide vapors at a temperature above 1,400° F. for at least 10 minutes, the initial contacting of said body with said boric oxide being effected while said body is still in the glassy state, said contacting being effected until said boric oxide vapors have reacted with surface layers of said body to form an integral surface layer of borosilicate glass on said body, and continuing heating said body and thereby thermally crystallizing said body to a glass ceramic body, having said integral surface layer and having a lineal coefficient of thermal expansion of at least $50 \times 10^{-7}/°$ C. over the range 0° to 300° C. and cooling the resulting composite body, therby producing a compressive stress in said glass layer.

2. The product of the process of claim 1.

3. The method of making a strong, high expansion ceramic body resulting from thermal crystallization of an aluminosilicate glass body comprising $SiO_2$, $Al_2O_3$ and a nucleant selected from $TiO_2$, $ZrO_2$, $SnO_2$ and $Cr_2O_3$ present in the glass composition in an amount from 0.1 to 12 weight percent, which comprises contacting said body with boric oxide vapors after the glass body is converted to a high expansion at least partially crystalline ceramic body by thermal in situ crystallization of said aluminosilicate glass body, said contacting of said body with said boric oxide vapors taking place at a temperature above 1,400° F. for at least 10 minutes until said boric oxide vapors have reacted with surface layers of said ceramic body to form an integral surface layer of borosilicate glass on said ceramic body, the lineal coefficient of thermal expansion of said ceramic body being at least $50 \times 10^{-7}/°$C. over the range 0 to 300° C. and cooling the resulting composite body, thereby producing a compressive stress in said glass layer.

4. A product of the process of claim 3.

* * * * *